(12) United States Patent
Koyama et al.

(10) Patent No.: US 11,525,726 B2
(45) Date of Patent: Dec. 13, 2022

(54) LIQUID SENSOR

(71) Applicant: NIPPON PILLAR PACKING CO., LTD., Osaka (JP)

(72) Inventors: Tatsunari Koyama, Osaka (JP); Akira Nakatsu, Osaka (JP)

(73) Assignee: NIPPON PILLAR PACKING CO., LTD., Osaka (JP)

( * ) Notice: Subject to any disclaimer, the term of this patent is extended or adjusted under 35 U.S.C. 154(b) by 0 days.

(21) Appl. No.: 17/178,840

(22) Filed: Feb. 18, 2021

(65) Prior Publication Data

US 2021/0255023 A1 Aug. 19, 2021

(30) Foreign Application Priority Data

Feb. 19, 2020 (JP) .............................. JP2020-025741

(51) Int. Cl.
*G01F 23/263* (2022.01)
*G01N 27/22* (2006.01)

(52) U.S. Cl.
CPC ........... *G01F 23/266* (2013.01); *G01N 27/22* (2013.01)

(58) Field of Classification Search
CPC .... G01F 23/265; G01F 23/266; G01F 23/268; G01F 23/26; G01F 23/263; G01F 23/242; G01F 23/241; G01F 1/56; G01F 25/0061; G01N 27/22

See application file for complete search history.

(56) References Cited

U.S. PATENT DOCUMENTS

| | | | | |
|---|---|---|---|---|
| 2002/0061722 A1* | 5/2002 | Kondo | ................... | B24B 37/04 451/60 |
| 2016/0041021 A1* | 2/2016 | Saitou | ................... | G01F 23/268 73/304 C |
| 2016/0069852 A1* | 3/2016 | Lefeber | ................... | G01N 21/94 250/227.23 |
| 2018/0283915 A1* | 10/2018 | Huang | ................... | G01F 23/802 |
| 2022/0086959 A1* | 3/2022 | Mironov | ................. | A24F 40/40 |

FOREIGN PATENT DOCUMENTS

JP 2013-88374 A 5/2013

* cited by examiner

*Primary Examiner* — John Fitzgerald
*Assistant Examiner* — Truong D Phan
(74) *Attorney, Agent, or Firm* — Birch, Stewart, Kolasch & Birch, LLP

(57) ABSTRACT

Provided is a liquid sensor capable of relatively accurately detecting the liquid level even if vibration or the like occurs. The liquid sensor is configured to detect a liquid level in a state in which at least a portion of the liquid sensor is immersed in liquid. This liquid sensor includes a substrate. The substrate is provided with a hole. An inner circumferential surface of the substrate is formed around the hole. A first electrode and a second electrode facing the first electrode are formed on the inner circumferential surface. The liquid sensor further includes a detection circuit. The detection circuit is configured to detect capacitance between the first and second electrodes.

5 Claims, 10 Drawing Sheets

LIQUID SENSOR

TECHNICAL FIELD

The present invention relates to a liquid sensor.

BACKGROUND ART

JP 2013-088374A discloses a fuel detection apparatus for detecting the liquid level of fuel. This fuel detection apparatus includes a detection electrode installed on a substrate, and a tubular counter electrode that internally houses the substrate. With this fuel detection apparatus, the liquid level of fuel is detected based on the capacitance between the detection electrode and the counter electrode (see JP 2013-088374A).

JP 2013-088374A is an example of related art.

SUMMARY OF THE INVENTION

In the fuel detection apparatus (liquid sensor) disclosed in JP 2013-088374A described above, there is a possibility that the relative position between the tubular counter electrode and the substrate may shift due to vibration or the like, for example. In this case, the distance between the detection electrode and the counter electrode changes. The capacitance changes due to this change in distance, regardless of a change in the liquid level of fuel (liquid), and thus the liquid level of fuel cannot be accurately detected based on the capacitance.

The present invention has been made to resolve such issues, and aims to provide a liquid sensor capable of relatively accurately detecting the liquid level even if vibration or the like occurs.

A liquid sensor according to the present invention is configured to detect a liquid level in a state in which at least a portion of the liquid sensor is immersed in liquid. This liquid sensor includes a substrate. The substrate is provided with a hole. An inner circumferential surface of the substrate is formed around the hole. A first electrode and a second electrode facing the first electrode are formed on the inner circumferential surface. The liquid sensor further includes a detection circuit. The detection circuit is configured to detect capacitance between the first and second electrodes.

In this liquid sensor, the first and second electrodes are formed on the inner circumferential surface of the substrate. Thus, the distance between the first and second electrodes is unlikely to change due to vibration or the like. As a result, according to this liquid sensor, even if vibration or the like occurs, the liquid level (remaining amount) of liquid can be relatively accurately detected.

The above-described liquid sensor may be configured such that the substrate has a substantially rectangular shape having long sides and short sides, the hole has a substantially rectangular shape having long sides and short sides, the long sides of the hole extend along the long sides of the substrate, the short sides of the hole extend along the short sides of the substrate, the first and second electrodes are respectively formed on the long sides of the hole, and the first electrode and the second electrode are separated from each other on the short sides of the hole.

With the above-described liquid sensor, the substrate may be disposed such that the long sides of the substrate extend in a direction perpendicular to a liquid surface of the liquid.

Because the long sides of the substrate extend in a direction perpendicular to the liquid surface of the liquid in this liquid sensor, the first and second electrodes also extend in a direction perpendicular to the liquid surface of the liquid. Therefore, liquid is unlikely to remain between the first and second electrodes while the liquid surface moves downward. As a result, according to this liquid sensor, it is possible to inhibit a decrease in liquid level detection precision due to the liquid remaining between the first and second electrodes.

In the above-described liquid sensor, the substrate may be a fluororesin substrate.

According to this liquid sensor, the liquid level can be detected even in harsh environments because a fluororesin substrate has high weather resistance and chemical resistance.

The above-described liquid sensor may be configured such that the liquid sensor further includes a light-emitting element and a light-receiving element, in which first and second optical waveguides are embedded in the substrate, one end of the first optical waveguide faces one end of the second optical waveguide via the hole, the light-emitting element is attached to another end of the first optical waveguide, the light-receiving element is attached to another end of the second optical guide, and the detection circuit detects output of the light-receiving element.

If liquid located in the hole is of good liquid quality, the output of the light-receiving element increases, whereas if liquid located in the hold is of poor liquid quality, the output of the light-receiving element decreases. With this liquid sensor, the liquid quality is detected by detecting the output of the light-receiving element. That is, according to this liquid sensor, both the liquid level and liquid quality can be detected using a shared substrate.

According to the present invention, it is possible to provide a liquid sensor capable of relatively accurately detecting a liquid level even if vibration or the like occurs.

EMBODIMENTS OF THE INVENTION

Figure 1:
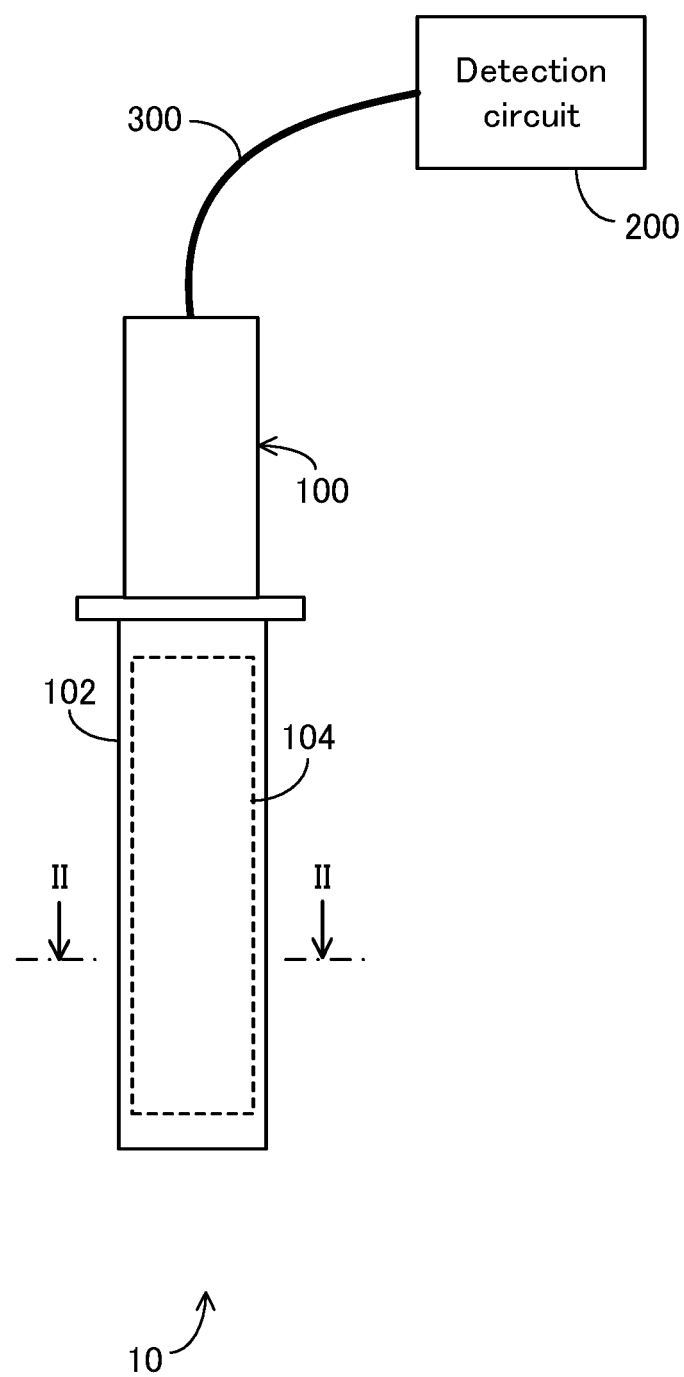
FIG. 1 is a diagram schematically showing a configuration of a liquid sensor.

Hereinafter, embodiments of the present invention will be described in detail with reference to the drawings. Note that, in the drawings, identical or corresponding portions have been assigned the same reference numerals, and their explanation is not repeated.

1. Embodiment 1

1-1. Configuration of Liquid Sensor

FIG. 1 is a diagram schematically showing a configuration of a liquid sensor 10 according to Embodiment 1. The liquid sensor 10 is to be attached to the inside of an oil tank of a vehicle or the like, and is configured to electrically detect the remaining amount (liquid level) of fuel (oil). That is, the liquid sensor 10 detects the liquid level of fuel in a state in which at least a portion of the liquid sensor 10 is immersed in the fuel.

As shown in FIG. 1, the liquid sensor 10 includes a liquid sensor main body 100, a detection circuit 200, and a cable 300. In the liquid sensor main body 100, a substrate 104 is housed in a plug 102. Although details will be described later, the substrate 104 includes two electrodes that face each other, and the capacitance between the electrodes changes according to the remaining amount of fuel. The detection circuit 200 detects the capacitance between the electrodes by using a known technique. The detection circuit 200 detects the remaining amount of fuel based on the capacitance between the electrodes.

Figure 2:
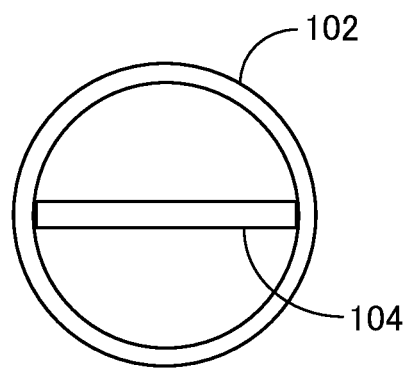
FIG. 2 is a diagram schematically showing a cross-section taken along II-II in FIG. 1.

FIG. 2 is a diagram schematically showing a cross-section taken along II-II in FIG. 1. As shown in FIG. 2, the plug 102 is tubular, and the substrate 104 is housed in the inner portion of the plug 102. There is a possibility that the relative position between the tubular plug 102 and the substrate 104 may shift due to vibration or the like, for example. If one of the electrodes provided on the substrate 104 is provided on the plug 102, the distance between the electrodes changes based on positional shift between the plug 102 and the substrate 104. The capacitance between the electrodes changes due to this change in distance, regardless of a change in the liquid level of fuel, and thus the liquid level of fuel cannot be accurately detected based on the capacitance.

Such issues are resolved by devising the configuration of the substrate 104 in the liquid sensor 10 according to Embodiment 1. Next, the configuration of the substrate 104 will be described in detail.

1-2. Configuration of Substrate

Figure 3:
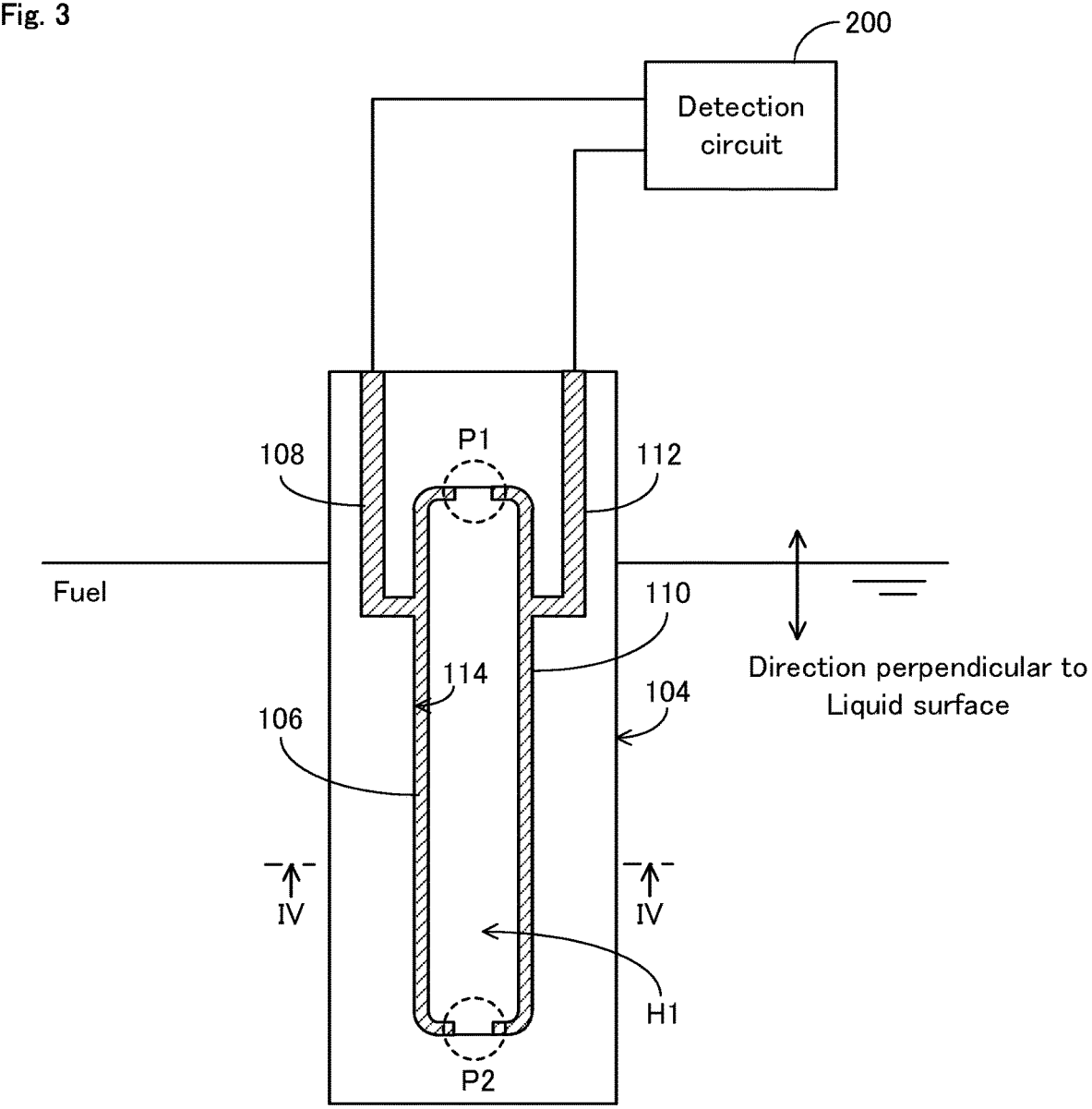
FIG. 3 is a plan view schematically showing a substrate.
Figure 4:
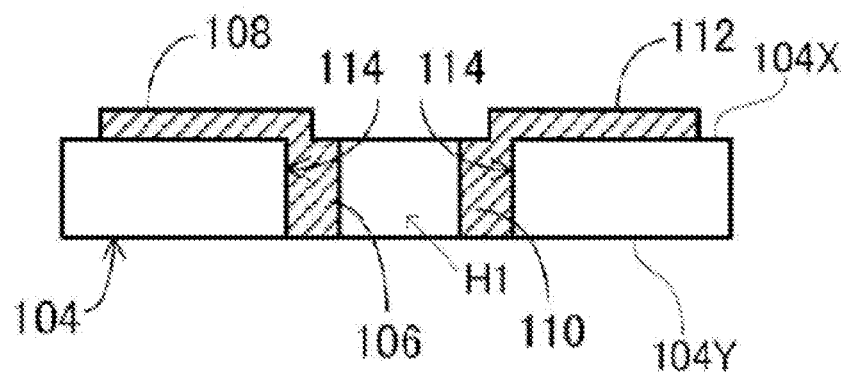
FIG. 4 is a diagram schematically showing a cross-section taken along IV-IV in FIG. 3.

FIG. 3 is a plan view schematically showing the substrate 104. FIG. 4 is a diagram schematically showing a cross-section taken along IV-IV in FIG. 3. The substrate 104 is a so-called fluororesin substrate.

Referring to FIGS. 3 and 4, the shape of the substrate 104 is a substantially rectangular shape having long sides and short sides. The substrate 104 having a main first surface 104X and a main second surface 104Y opposite the main first surface 104X. A hole H1 is provided in a central portion of the substrate 104. The hole H1 goes through the main first surface 104X and the main second surface 104Y. The hole H1 defines an inner circumferential surface of the substrate 104. A hole H1 is provided in a central portion of the substrate 104. The shape of the hole H1 is a substantially rectangular shape having long sides and short sides. The long sides of the hole H1 extend along the long sides of the substrate 104, and the short sides of the hole H1 extend along the short sides of the substrate 104.

An inner circumferential surface 114 of the substrate 104 is formed around the hole H1. An electrode 106 is formed on a surface of the inner circumferential surface 114 that extends along one of the long sides of the hole H1, and an electrode 110 is formed on a surface of the inner circumferential surface 114 that extends along the other of the long sides of the hole H1.

The electrode 106 and the electrode 110 face each other. Although the electrode 106 and the electrode 110 are also formed on portions of the surface of the inner circumferential surface 114 that extend along the short sides of the hole H1, a gap P1 and a gap P2 are provided between the electrode 106 and the electrode 110, and the electrode 106 and the electrode 110 are separated from each other. Note that the length between the electrodes 106 and 110 is preferably a length where fuel does not remain between the electrodes 106 and 110 due to surface tension after the liquid level of fuel has moved downward.

Note that the electrode 106 need only be formed on at least a portion of the surface of the inner circumferential surface 114 that extends along one of the long sides of the hole H1, and need not be formed on the surface of the inner circumferential surface 114 that extends along the short sides of the hole H1. Also, the electrode 110 need only be formed on at least a portion of the surface of the inner circumferential surface 114 that extends along the other of the long sides of the hole H1, and need not be formed on the surface of the inner circumferential surface 114 that extends along the short sides of the hole H1. Also, the area of the electrodes 106 and 110 can be increased by increasing the thickness of the substrate 104, and as a result, the capacitance between the electrodes 106 and 110 can be increased.

L-shaped wirings 108 and 112 are formed on a main surface of the substrate 104. The wiring 108 is electrically connected to the electrode 106, and is also electrically connected to the detection circuit 200. The wiring 112 is electrically connected to the electrode 110, and is also electrically connected to the detection circuit 200.

Note that the electrodes 106 and 110 and the wirings 108 and 112 are each composed of a conductive material such as gold, silver, copper, or aluminum, for example. Also, the electrodes 106 and 110 and the wirings 108 and 112 may be coated with a fluororesin, for example.

When the liquid sensor 10 (FIG. 1) is used, the substrate 104 is disposed such that the long sides of the substrate 104 extend in a direction perpendicular to the liquid surface of fuel. The amount of fuel located between the electrode 106 and the electrode 110 changes due to changes in the height of the liquid surface of fuel. As a result, the relative permittivity of a substance present between the electrode 106 and the electrode 110 changes, and the capacitance between the electrode 106 and the electrode 110 changes. The detection circuit 200 stores the relationship between the capacitance between the electrodes 106 and 110 and the remaining amount of fuel in advance, and detects the remaining amount of fuel based on the capacitance between the electrodes 106 and 110.

Both the electrodes 106 and 110 are formed on the inner circumferential surface 114 of the substrate 104 in the liquid sensor 10 according to Embodiment 1. Thus, the distance between the electrodes 106 and 110 is unlikely to change due to vibration or the like. As a result, according to the liquid sensor 10, even if vibration or the like occurs, the liquid level of fuel can be relatively accurately detected.

Also, a case is conceivable in which a substrate provided with comb-shaped electrodes is used in order to detect the liquid level of fuel, for example.

Figure 5:
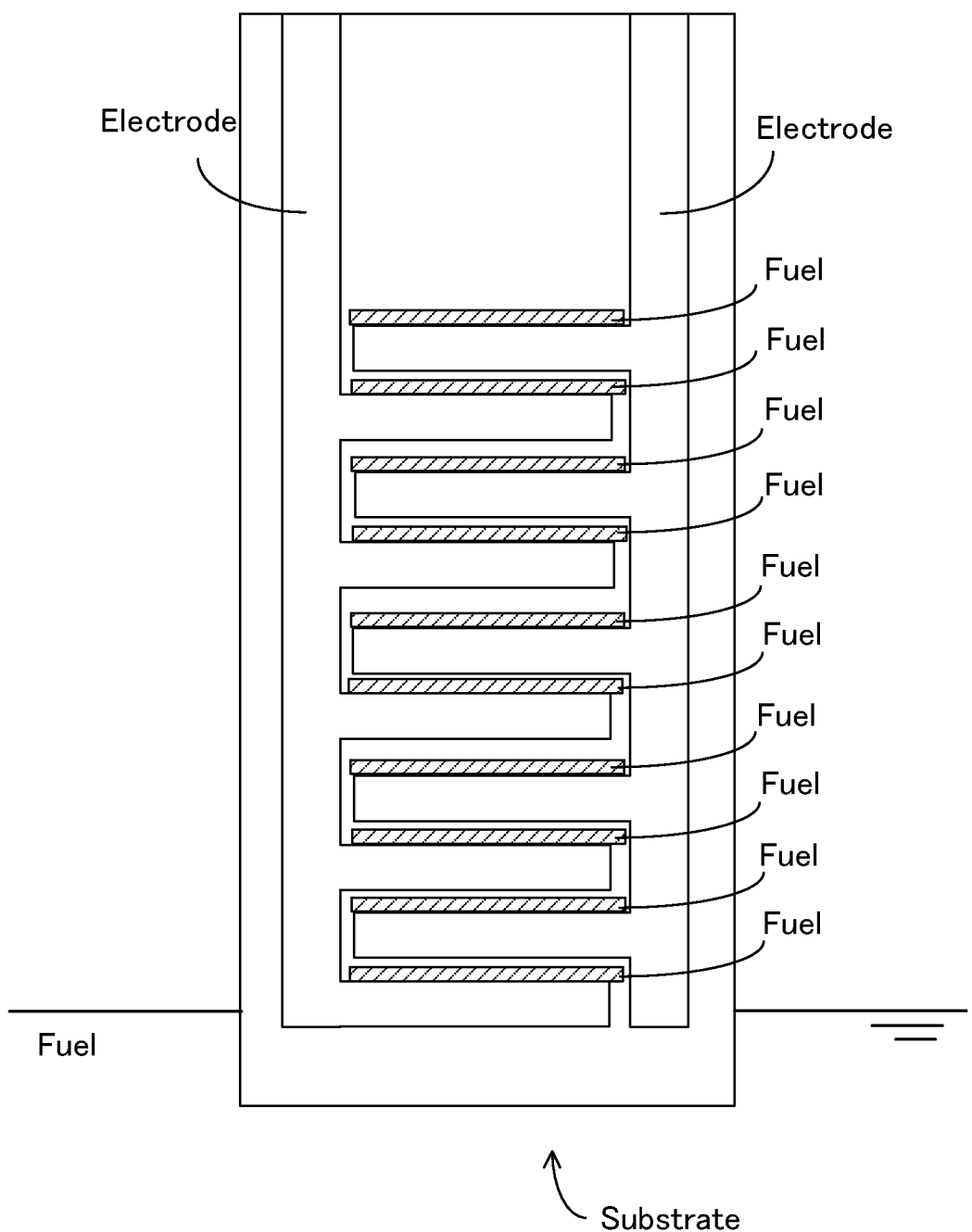
FIG. 5 is a diagram schematically showing a substrate provided with comb-shaped electrodes.

FIG. 5 is a diagram schematically showing a substrate provided with comb-shaped electrodes. As shown in FIG. 5, in such a case, fuel is likely to remain between the comb-shaped electrodes while the liquid surface of fuel moves downward. If fuel remains between the comb-shaped electrodes, the capacitance between the electrodes does not change appropriately as the liquid surface of fuel moves downward, and thus the remaining amount of fuel cannot be accurately detected based on the capacitance.

Because the long sides of the substrate 104 extend in a direction perpendicular to the liquid surface of fuel in the liquid sensor 10 according to Embodiment 1, the electrodes 106 and 110 also extend in a direction perpendicular to the liquid surface of fuel. Therefore, fuel is unlikely to remain between the electrodes 106 and 110 while the liquid surface of fuel moves downward. As a result, according to the liquid sensor 10, it is possible to inhibit a decrease in liquid level detection precision due to fuel remaining between the electrodes 106 and 110.

Also, the substrate 104 is a fluororesin substrate in the liquid sensor 10 according to Embodiment 1. According to the liquid sensor 10, the liquid level of fuel can be detected in harsh environments because the fluororesin substrate has high weather resistance and chemical resistance.

1-3. Method for Manufacturing Substrate

Figure 6:
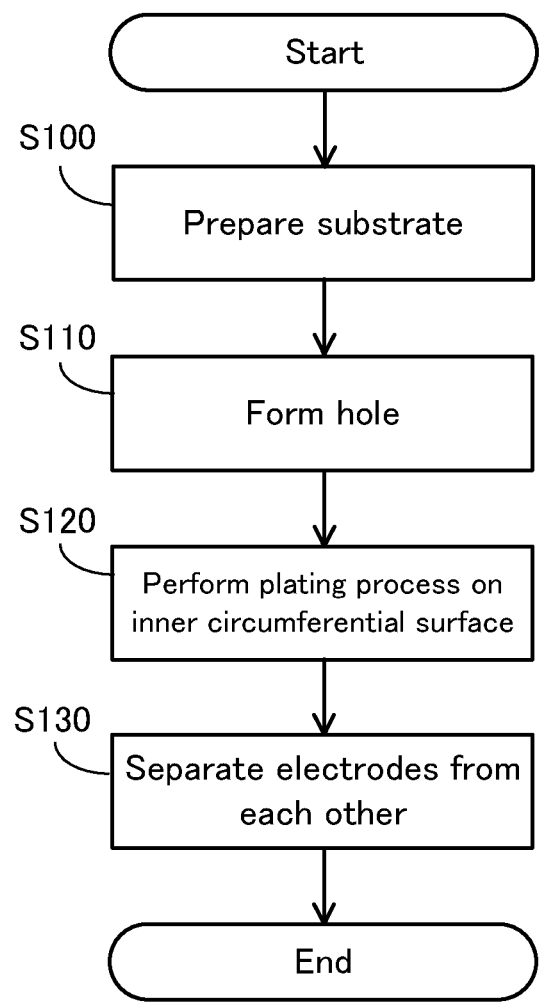
FIG. 6 is a flowchart showing a procedure for manufacturing a substrate.

FIG. 6 is a flowchart showing a procedure for manufacturing the substrate 104. Processing shown in FIG. 6 is executed by an apparatus for manufacturing the substrate 104, for example.

Referring to FIG. 6, the manufacturing apparatus prepares a substrate in which wiring is printed on a main surface thereof (step S100). The manufacturing apparatus forms the hole H1 in the substrate through punching with a router or a press (step S110). The manufacturing apparatus performs plating on the inner circumferential surface 114 around the hole H1 (step S120). The manufacturing apparatus separates the electrode 106 and the electrode 110 from each other by forming the gaps P1 and P2 through punching with a router or a press (step S130). Accordingly, the substrate 104 is complete.

1-4. Operation of Liquid Sensor

As described above, the liquid sensor 10 is used in a state in which the liquid sensor 10 is installed in an oil tank. The detection circuit 200 detects the capacitance between the electrodes 106 and 110 in a state in which the detection circuit 200 applies a predetermined voltage between the electrodes 106 and 110. This detection is made using various known methods. The detection circuit 200 detects the liquid level (remaining amount) of fuel based on the detected capacitance. The result of the detection is output to an external monitor or the like, for example. Accordingly, a user can visually recognize the remaining amount of fuel.

1-5. Features

As described above, both the electrodes 106 and 110 are formed on the inner circumferential surface 114 of the substrate 104 in the liquid sensor 10 according to Embodiment 1. Thus, the distance between the electrodes 106 and 110 is unlikely to change due to vibration or the like. As a result, according to the liquid sensor 10, even if vibration or the like occurs, the liquid level of fuel can be relatively accurately detected.

2. Embodiment 2

Only the liquid level of fuel is detected in the above-described liquid sensor 10 according to Embodiment 1. With the liquid sensor according to Embodiment 2, the liquid quality of fuel is detected, in addition to the liquid level of fuel. The following mainly describes portions that are different from those in Embodiment 1 described above.

2-1. Configuration of Substrate

Figure 7:
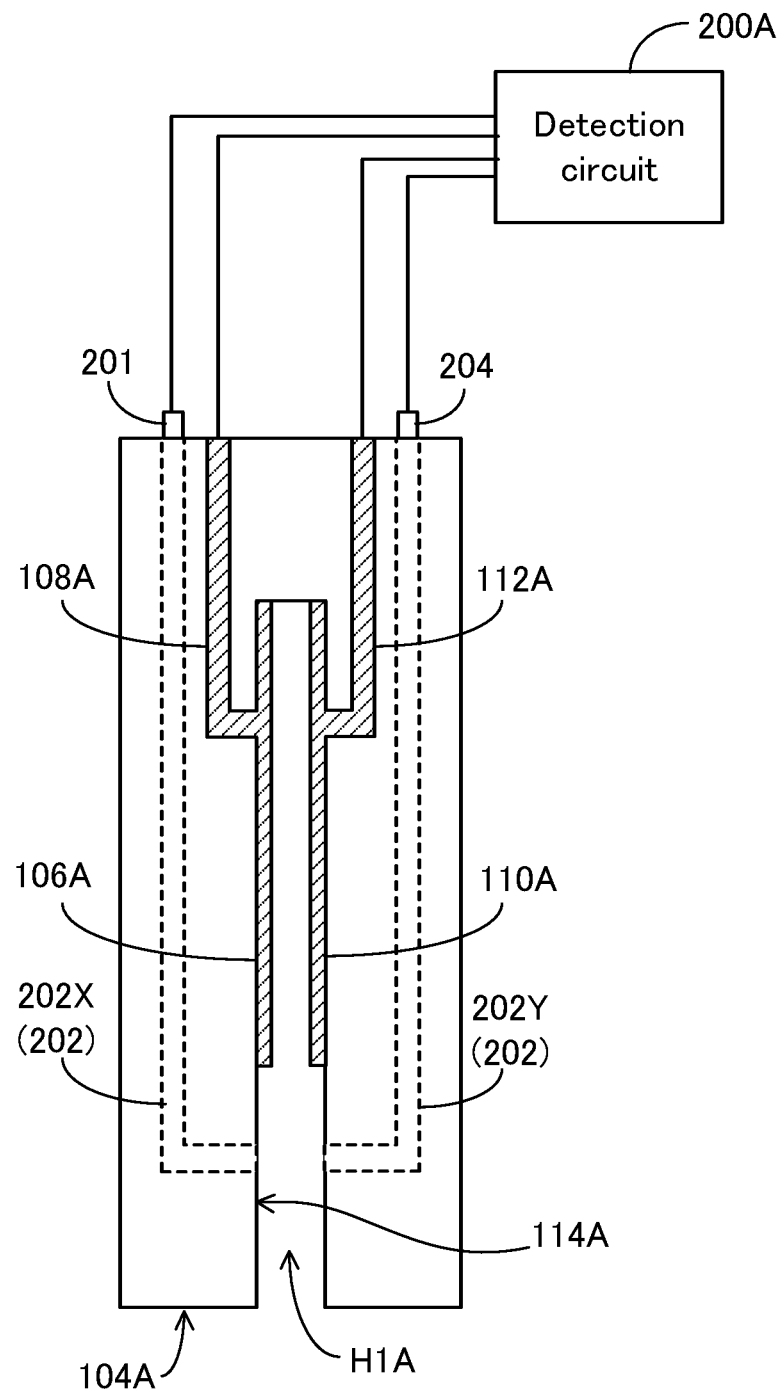
FIG. 7 is a plan view schematically showing a substrate in Embodiment 2.

FIG. 7 is a plan view schematically showing a substrate 104A included in a liquid sensor according to Embodiment 2. As shown in FIG. 7, the substrate 104A has a shape obtained as a result of a hole H1A portion being hollowed out from a substantially rectangular shape having long sides and short sides. The shape of the hole H1A is a substantially rectangular shape having long sides and short sides. The hole H1A passes through the substrate 104A downward in the longitudinal direction thereof. The long sides of the hole H1A extend along the long sides of the substrate 104A, and the short sides of the hole H1A extend along the short sides of the substrate 104A.

An inner circumferential surface 114A of the substrate 104A is formed around the hole H1A. An electrode 106A is formed on a portion of a surface of the inner circumferential surface 114A that extends along one of the long sides of the hole H1A, and an electrode 110A is formed on a portion of a surface of the inner circumferential surface 114A that extends along the other of the long sides of the hole H1A.

The electrode 106A and the electrode 110A face each other. The electrode 106 and the electrode 110 are not formed on surfaces of the inner circumferential surface 114A that extend along the short sides of the hole H1A.

L-shaped wirings 108A and 112A are formed on a main surface of the substrate 104A. The wiring 108A is electrically connected to the electrode 106A, and is also electrically connected to a detection circuit 200A. The wiring 112A is electrically connected to the electrode 110A, and is also electrically connected to the detection circuit 200A.

Before the hole H1A is formed in the substrate 104A, an optical waveguide 202 is formed in the substrate 104A. The optical waveguide 202 is separated into optical waveguides 202X and 202Y due to the hole H1A being formed in the substrate 104A. That is, the optical waveguides 202X and 202Y are embedded in the substrate 104A. The optical waveguide 202 is composed of optical fibers, for example.

One end of the optical waveguide 202X faces one end of the optical waveguide 202Y via the hole H1A. A light-emitting element 201 is attached to the other end of the optical waveguide 202X. The light-emitting element 201 is composed of an LED (Light Emitting Diode) or a semiconductor laser, for example. The light-emitting element 201 is configured to emit light according to an instruction received from the detection circuit 200A.

A light-receiving element 204 is attached to the other end of the optical waveguide 202Y. The light-receiving element 204 is composed of a phototransistor, a photodiode, or a photo-conductive cell, for example. The light-receiving element 204 is configured to receive light emitted from the light-emitting element 201 via the optical waveguides 202X and 202Y, and output a voltage according to the amount of received light.

When the liquid sensor according to Embodiment 2 is used, the substrate 104A is immersed in fuel. The hole H1A is filled with fuel in a state in which the substrate 104A is immersed in the fuel. That is, light emitted from the light-emitting element 201 passes through the optical waveguide 202X, passes through the fuel present in the hole H1A, passes through the optical waveguide 202Y, and thus is received by the light-receiving element 204. If the liquid quality of fuel present in the hole H1A is high, the intensity of light received by the light-receiving element 204 is high. On the other hand, if the liquid quality of the fuel present in the hole H1A is poor, the intensity of light received by the light-receiving element 204 is low. The detection circuit 200A has stored the relationship between the amount of light received by the light-receiving element 204 and the liquid quality of the fuel in advance, and detects the liquid quality of the fuel based on the amount of light received by the light-receiving element 204.

Note that the principle that the liquid level of fuel is detected by the liquid sensor according to Embodiment 2 is the same as that of the liquid sensor 10 according to Embodiment 1 described above.

In this manner, the liquid quality of fuel is detected as a result of the liquid sensor according to Embodiment 2 detecting the output of the light-receiving element 204. That is, according to this liquid sensor, both liquid level and liquid quality of the fuel can be detected using the shared substrate 104A.

2-2. Method for Manufacturing Substrate

Figure 8:
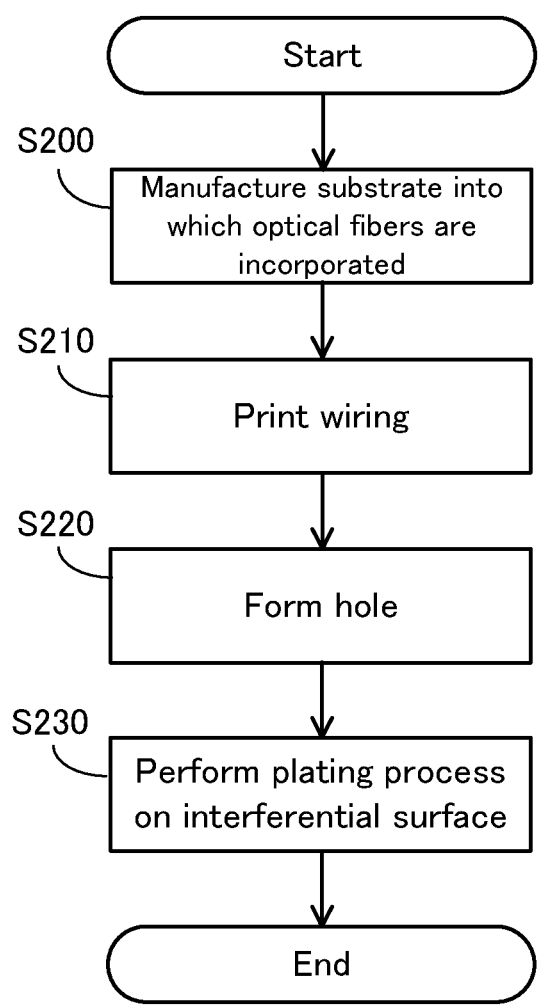
FIG. 8 is a flowchart showing a procedure for manufacturing a substrate in Embodiment 2.

FIG. 8 is a flowchart showing a procedure for manufacturing the substrate 104A. Processing shown in FIG. 8 is executed by an apparatus for manufacturing the substrate 104A, for example. Referring to FIG. 8, the manufacturing apparatus manufactures a substrate into which optical fibers (the optical waveguide 202) are incorporated (step S200).

Figure 9:
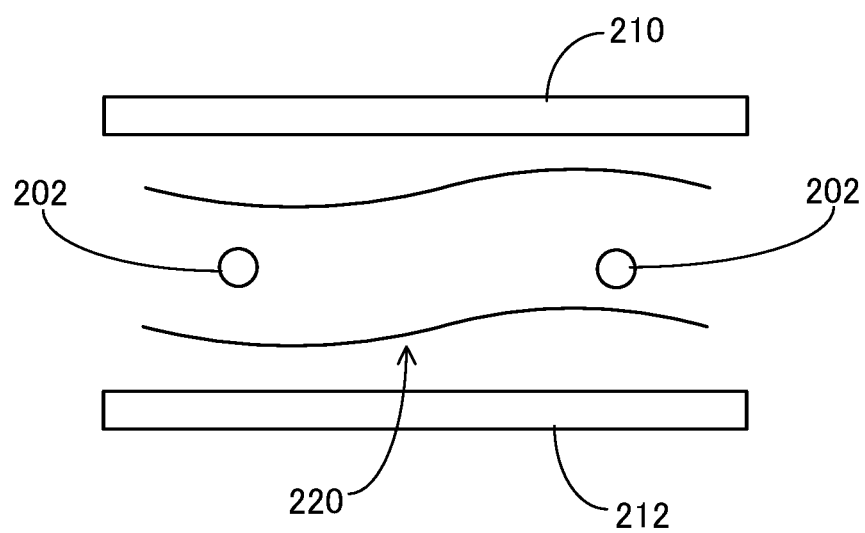
FIG. 9 is a diagram illustrating a method for manufacturing a substrate into which optical fibers are incorporated.

FIG. 9 is a diagram illustrating a method for manufacturing a substrate into which optical fibers are incorporated. As shown in FIG. 9, a fluororesin 220 in which the optical waveguide 202 is embedded at a desired position is held between copper foils 210 and 212. The fluororesin 220 held between the copper foils 210 and 212 is formed through heat fusion. Then, the copper foils 210 and 212 are removed through acid treatment. Accordingly, a substrate into which optical fibers are incorporated is complete.

Referring to FIG. 8 again, the manufacturing apparatus prints wiring (wirings 108A and 112A) on a main surface of the substrate into which the optical fibers are incorporated (step S210). The manufacturing apparatus forms the hole H1A in the substrate (step S220). The manufacturing apparatus forms the electrodes 106A and 110A by performing a plating process on portions of the surfaces of the inner circumferential surface 114 that extend along the long sides of the hole H1A (step S230). At this time, the manufacturing apparatus does not perform a plating process on the optical waveguides 202X and 202Y exposed on the hole H1A side. Accordingly, the substrate 104A is complete.

2-3. Operation of Liquid Sensor

Similar to the liquid sensor 10 according to Embodiment 1 described above, the liquid sensor according to Embodiment 2 is used in a state in which the liquid sensor is installed in an oil tank. The detection circuit 200A detects the capacitance between the electrodes 106A and 110A in a state in which the detection circuit 200A applies a predetermined voltage between the electrodes 106A and 110A. This detection is made using various known methods. The detection circuit 200A detects the liquid level (remaining amount) of fuel based on the detected capacitance. The result of the detection is output to an external monitor or the like, for example. Accordingly, a user can visually recognize the remaining amount of fuel.

Also, the detection circuit 200A makes the light-emitting element 201 emit light in the liquid sensor according to Embodiment 2. Light emitted from the light-emitting element 201 passes through the optical waveguide 202X, passes through the fuel present in the hole H1A, passes through the optical waveguide 202Y, and thus, is received by the light-receiving element 204. The detection circuit 200A detects a voltage output by the light-receiving element 204. The detection circuit 200A detects the liquid quality of fuel based on the output voltage.

When the voltage output by the light-receiving element 204 is less than or equal to a predetermined value, for example, the detection circuit 200A determines that fuel contamination is at a predetermined level or higher. The result of the determination is output to an external monitor or the like, for example. Accordingly, a user can visually recognize the liquid quality of fuel.

2-4. Features

As described above, the liquid quality of fuel is detected as a result of the liquid sensor according to Embodiment 2 detecting a voltage output by the light-receiving element 204. That is, according to this liquid sensor, both liquid level and liquid quality of the fuel can be detected using the shared substrate 104A.

3. Variations

Although the embodiments have been described above, the present invention is not limited to the above-described embodiments, and various modifications can be made without departing from the gist of the invention. Hereinafter, variations will be described.

In Embodiments 1 and 2 described above, the electrodes 106 and 106A are respectively disposed in parallel to the electrodes 110 and 110A in a plan view. However, the electrodes 106 and 106A need not always be disposed in parallel to the electrodes 110 and 110A.

Figure 10:
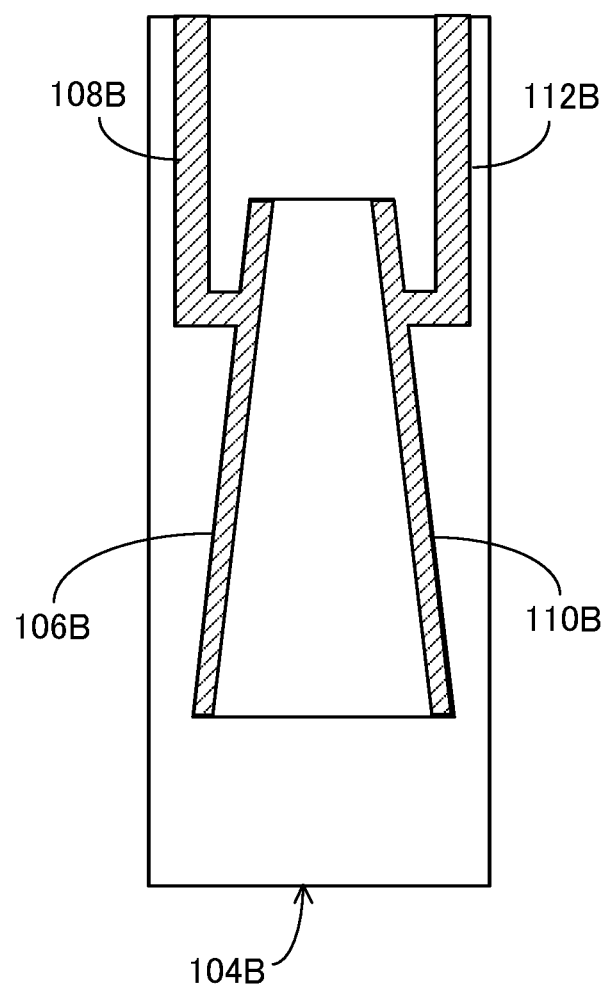
FIG. 10 is a plan view schematically showing a substrate in a variation.

FIG. 10 is a plan view schematically showing a substrate 104B in a variation. As shown in FIG. 10, the substrate 104B includes an electrode 106B and an electrode 110B. The electrode 106B is not disposed in parallel to the electrode 110B. The above-described electrodes in Embodiments 1 and 2 may be disposed in such a positional relationship.

Also, in Embodiment 1 described above, the substrate 104 is disposed such that the long sides of the substrate 104 extend in a direction perpendicular to the liquid surface of fuel when the liquid sensor 10 is used. However, the substrate 104 need not always be disposed such that the long sides of the substrate 104 extend in a direction perpendicular to the liquid surface of the fuel. The substrate 104 may be disposed at any angle with respect to the liquid surface of the fuel as long as the capacitance between the electrodes 106 and 110 changes following a change in the liquid level of fuel.

Also, in Embodiments 1 and 2 described above, the liquid sensor 10 or the like is attached to the inside of an oil tank, and the liquid level (remaining amount) of fuel is detected. However, the liquid level detected by the liquid sensor 10 or the like is not limited to the liquid level of fuel. A configuration may be adopted in which the liquid sensor 10 or the like is attached to the inside of a tank that vibrates when the liquid sensor 10 operates, for example, and the liquid sensor 10 detects the liquid level of water, various aqueous solutions (e.g., an acidic aqueous solution and an alkaline aqueous solution), alcohols, solvents, oil (e.g., differential oil or lubricating oil for devices that vibrate), and the like. That is, the liquid sensor 10 or the like need only detect the liquid level in a state in which at least a portion of the liquid sensor 10 is immersed in liquid.

LIST OF REFERENCE NUMERALS

10 Liquid sensor
100 Liquid sensor main body
102 Plug
104, 104A, 104B Substrate
106, 106A, 106B, 110, 110A, 110B Electrode
108, 108A, 108B, 112, 112A, 112B Wiring
104, 104A Inner circumferential surface
200, 200A Detection circuit
201 Light-emitting element
202, 202X, 202Y Optical waveguide
204 Light-receiving element
210, 212 Copper foil
220 Fluororesin
300 Cable
H1, H1A Hole
P1, P2 Gap

What is claimed is:

1. A liquid sensor configured to detect a level of a liquid in a container in a state in which at least a portion of the liquid sensor is immersed in the liquid contained by the container, the liquid sensor comprising:
   a substrate having a main first surface and a main second surface opposite the main first surface, wherein the substrate is provided with a hole through the main first and second surfaces, and the hole defines an inner circumferential surface of the substrate,
   a first electrode and a second electrode facing the first electrode which are formed on the inner circumferential surface, and
   a detection circuit configured to detect capacitance between the first and second electrodes.

2. The liquid sensor according to claim 1, wherein the substrate is a fluororesin substrate.

3. The liquid sensor according to claim 1, further comprising:
   a light-emitting element; and
   a light-receiving element,
   wherein first and second optical waveguides are embedded in the substrate,
   one end of the first optical waveguide faces one end of the second optical waveguide via the hole,
   the light-emitting element is attached to another end of the first optical waveguide,
   the light-receiving element is attached to another end of the second optical waveguide, and
   the detection circuit is configured to detect output of the light-receiving element.

4. The liquid sensor according to claim 1,
   wherein the substrate has a substantially rectangular shape having long sides and short sides,
   the hole has a substantially rectangular shape having long sides and short sides,
   the long sides of the hole extend along the long sides of the substrate, and the short sides of the hole extend along the short sides of the substrate,
   the first and second electrodes are respectively formed on the long sides of the hole, and
   the first electrode and the second electrode are separated from each other on the short sides of the hole.

5. The liquid sensor according to claim 4, wherein the substrate is disposed such that the long sides of the substrate extend in a direction perpendicular to a liquid surface of the liquid.

* * * * *